US012393163B2

(12) United States Patent
Dubois et al.

(10) Patent No.: US 12,393,163 B2
(45) Date of Patent: Aug. 19, 2025

(54) HOROLOGICAL CONTROL DEVICE

(71) Applicant: ETA SA Manufacture Horlogère Suisse, Grenchen (CH)

(72) Inventors: Fabian Dubois, Le Locle (CH); Raphael Balmer, Vicques (CH); Vittorio Zanesco, Cortaillod (CH)

(73) Assignee: ETA SA MANUFACTURE HORLOGÈRE SUISSE, Grenchen (CH)

( * ) Notice: Subject to any disclaimer, the term of this patent is extended or adjusted under 35 U.S.C. 154(b) by 319 days.

(21) Appl. No.: 18/155,508

(22) Filed: Jan. 17, 2023

(65) Prior Publication Data

US 2023/0266713 A1 Aug. 24, 2023

(30) Foreign Application Priority Data

Feb. 22, 2022 (EP) .................................... 22158028

(51) Int. Cl.
*G04B 3/04* (2006.01)
*G04B 37/06* (2006.01)

(52) U.S. Cl.
CPC ............. *G04B 3/041* (2013.01); *G04B 37/06* (2013.01)

(58) Field of Classification Search
CPC ........ G04B 3/041; G04B 37/06; G04B 3/043; G04B 37/04; G04B 3/046; G04C 3/004; G04G 17/02; G04G 21/02
See application file for complete search history.

(56) References Cited

U.S. PATENT DOCUMENTS

| | | | | |
|---|---|---|---|---|
| 8,371,745 | B2 * | 2/2013 | Manni .................... | G04C 3/004 368/308 |
| 10,613,481 | B2 * | 4/2020 | Iguchi .................... | G04B 3/041 |
| 11,042,122 | B2 | 6/2021 | Iguchi | |
| 2016/0313701 | A1 * | 10/2016 | Coakley ................ | G04B 3/048 |
| 2021/0173351 | A1 * | 6/2021 | Vuille .................... | G01D 5/142 |

FOREIGN PATENT DOCUMENTS

| | | |
|---|---|---|
| EP | 3 650 961 A1 | 5/2020 |
| KR | 10-2016-0070999 A | 6/2016 |

OTHER PUBLICATIONS

European Search Report for EP 22 15 8028 dated Jul. 18, 2022.

* cited by examiner

*Primary Examiner* — Edwin A. Leon
(74) *Attorney, Agent, or Firm* — Sughrue Mion, PLLC

(57) ABSTRACT

A control device (2) mounted in an opening (20) in a middle (16) and including a support (14) and a rotatable part, which has a shaft (12), a gripping member (4) and a control member (6) forming a rotation sensor (26). The sensor includes a magnetic detector provided inside the watch case in a radial peripheral region of the control member. On a first side of a circular opening (22), the support has a cavity (24) which is open in the axial direction. The cavity is configured to house the control member fixedly mounted on the shaft, such that this control member can be momentarily retracted, at least for the most part, into the cavity following an axial movement of the shaft into a position in which the magnetic detector is mounted inside the watch case.

10 Claims, 2 Drawing Sheets

HOROLOGICAL CONTROL DEVICE

CROSS REFERENCE TO RELATED APPLICATION

This application claims priority to European Patent Application No. 22158028.5 filed Feb. 22, 2022, the entire contents of which are incorporated herein by reference.

TECHNICAL FIELD OF THE INVENTION

The invention relates to the field of control devices intended to be mounted in a through-opening machined in a middle of a watch case and comprising a rotatable part and a support for this rotatable part, the rotatable part comprising a gripping member, a control member for a rotation sensor or for a mechanism provided inside the watch case, and a shaft connecting the gripping member and the control member.

TECHNOLOGICAL BACKGROUND

U.S. patent document No. 11,042,122 discloses a horological control device comprising a crown connected by a shaft to an inner pinion which meshes with a rotating flange having a lower toothing, whereby the flange can be rotated by a user via the outer crown. The rotating flange is intended to be mounted from the top of the watch case, i.e. on the dial side, and a bezel carrying a crystal to close the watch case is then intended to be mounted. The watch case is relatively complex and designed to allow the back to be easily removed so that the horological movement in particular can be mounted from below. The control device is seen to create limitations as regards the assembly of the watch. Firstly, the pinion is mounted from the inside, after inserting the support for the control device into an opening in the watch case. For this purpose, a key is provided to hold this pinion in position on the shaft. Once the control device has been fully mounted on the watch case, the rotating flange can then only be mounted from the top, which requires a case that allows this flange to be mounted from the top and thus requires a removable bezel.

The same problem arises in the case of a rotation sensor whose detector is provided in a radial peripheral region of the control member and which is located on the other side of this control member to the opening provided in the watch case for the insertion of this detector, which is generally integral with the horological movement or with an electronic module superimposed on such a horological movement. In such a case, the control member can only be mounted on the shaft after the detector has been inserted into the watch case, and thus generally the horological movement. This poses a problem because the control member for the rotation detector, in particular a magnetic detector comprising a radially-magnetised magnet forming the control member, cannot be mounted on the shaft of the control device prior to the detector being mounted inside the watch case and thus in general to the horological movement being mounted inside this watch case.

SUMMARY OF THE INVENTION

In order to remedy the technical issue mentioned in the technological background, while allowing the available volume inside the watch case, in particular substantially the entire internal horizontal dimensions of this watch case, to be efficiently occupied by the horological movement and optionally by an electronic module superimposed on this horological movement and/or a casing ring, the present invention relates to a control device intended to be mounted in a through-opening machined in a middle of a watch case and comprising a rotatable part and a support for this rotatable part. The rotatable part comprises a gripping member, a control member, forming a rotation sensor or provided to drive a mechanism located inside the watch case, and a shaft connecting the gripping member to the control member. The rotation sensor and the mechanism respectively comprise a detector and an element for coupling with the control member, which are provided inside the watch case in a radial peripheral region of the control member. The support has a circular opening through which the shaft passes and which has a diameter that is smaller than the maximum radial dimension of the control member and smaller than the maximum radial dimension of the gripping member. Then, on a first side of the circular opening, the support has a cavity which is open in the direction of the axis of rotation and which is intended to open out into the interior of the watch case, the dimensions of the cavity being provided such that the latter can house therein at least a most part of the control member which is fixedly mounted on the shaft, such that this control member can be momentarily retracted, at least for the most part, into the cavity following an axial movement of the shaft into a position in which the detector or the coupling element is mounted inside the watch case.

In a main embodiment, at least a most part of the portion of the support defining the cavity is provided within the through-opening machined in the middle.

In a preferred alternative embodiment, the cavity and the rotatable part are arranged such that an inner end part of the rotatable part, comprising the control member and located on the cavity side relative to the circular opening in the support, can be entirely housed within the cavity.

In a specific alternative embodiment, the control device comprises a removable element or a movable element which is arranged such that it can axially immobilise or restrict the axial motion of the rotatable part, and thereby prevent said at least a most part of the control member from being able to be inserted into the cavity without removing the removable element or moving the movable element releasing the rotatable part.

Other specific alternative embodiments will be described hereinbelow.

BRIEF DESCRIPTION OF THE FIGURES

The invention will be described in more detail hereinafter with reference to the accompanying drawings, given by way of examples that are in no way limiting, in which.

DETAILED DESCRIPTION OF THE INVENTION

Figure 1:
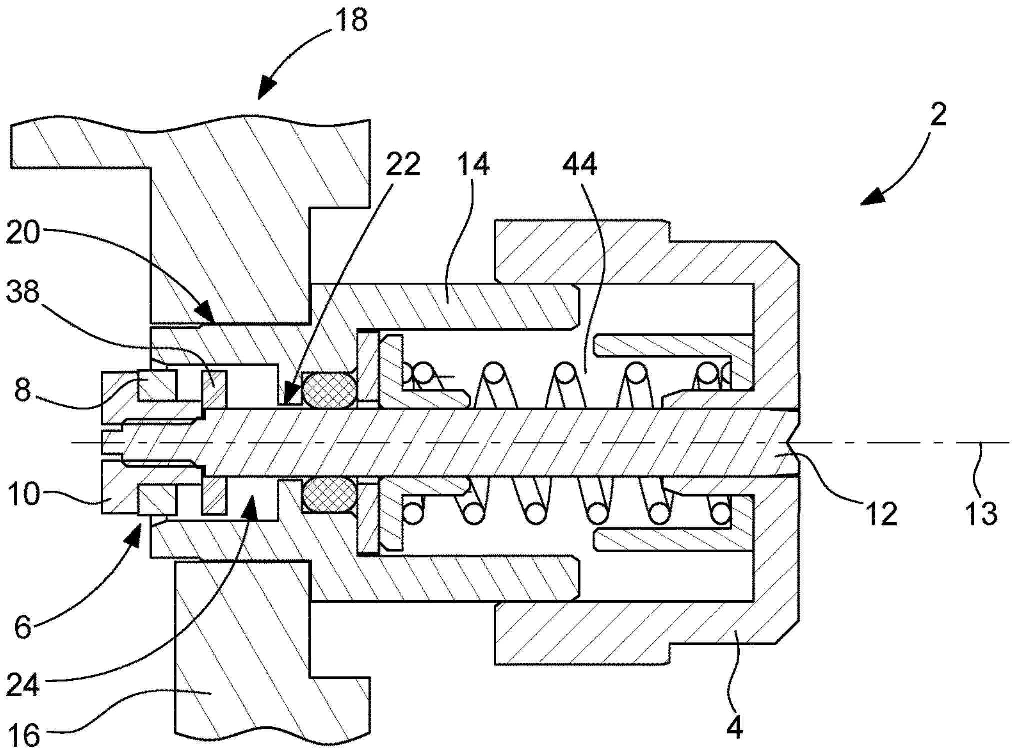
FIG. 1 shows a sectional view of one embodiment of a control device for a watch according to the invention before a movement and a detector, associated with the control device, have been mounted inside the watch case.

One embodiment of a horological control device according to one embodiment of the invention will be described hereinbelow with reference to the accompanying figures.

The control device 2 comprises a rotatable part which is formed by a gripping member 4, a control member 6 for a rotation sensor, which is provided inside a watch case 18, and a shaft 12 connecting the gripping member to the control member. The control device further comprises a support 14 for the rotatable part, which support is dimensioned so that it can be forcibly inserted into or bonded within a through-opening 20 machined in a middle 16 of the watch case. The support 14 comprises a circular opening 22 through which the shaft 12 passes and which has a diameter that is smaller than the maximum radial dimension D of the control member 6 and smaller than the maximum radial dimension of the gripping member 4.

The control member 6 comprises a magnet 8 having a radial magnetisation relative to the axis of rotation 13 of the rotatable member. This magnet is arranged on a cylindrical part 10 fixed to an inner end of the shaft 12, this cylindrical part forming, together with the magnet 8 and a washer 38, an inner end part of the rotatable part. Preferably, the magnet 8 is a multipole magnet. The term 'inner' is used with reference to the watch case on which the control device 2 is intended to be mounted. The washer 38 acts to form a first radial surface for providing axial support, on the control member 6 side, for a removable key 40 once in place on the shaft 12. The removable key 40 is provided in order to restrict an axial movement of the rotatable part once the movement 30 has been mounted within the watch case 18 with the magnetic detector 26 forming the rotation sensor. It should be noted that, in one alternative embodiment, wherein the cylindrical part 10 itself defines a radial surface on the circular opening 22 side, the washer 38 is not required and can be omitted. The inner end part is mounted on the inner end of the shaft 12, so as to rotate as one with this shaft, by screwing thanks to complementary threads provided on each, or/and by bonding, or by any other appropriate fixing means which can potentially involve the use of an element for fixing the inner end part to the shaft.

Figure 2:
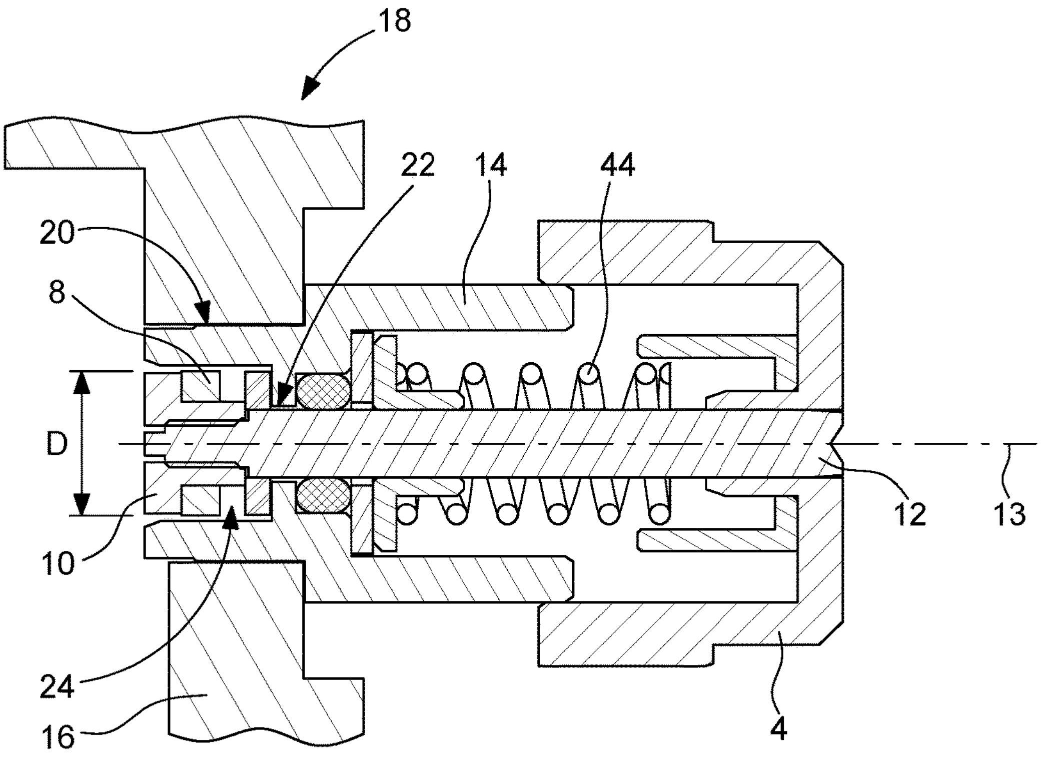
FIG. 2 shows the control device of FIG. 1 in a state in which it is intended to be when the movement and the detector are being mounted inside the watch case.

On the inner side of the circular opening 22, the support has a cavity 24 which is open in the direction of the axis of rotation 13 and which is intended to open out into the interior of the watch case 18. In general, the dimensions of the cavity are provided such that the latter can house at least a most part of the control member 6 mounted on the shaft 12. Preferably, as shown in FIG. 2, the cavity 24 and the rotatable part are arranged such that said inner end part of the rotatable part, which is located on the cavity side relative to the circular opening 22 in the support 14, can be housed almost entirely within the cavity or, advantageously, entirely within this cavity.

As indicated, the rotation sensor comprises a magnetic detector 26, which is arranged, relative to the axis of rotation 13 of the rotatable part, in a radial peripheral region of the control member, above the latter. The magnetic detector is fixedly arranged inside the watch case in the vicinity of the magnet 8 so as to be able to measure a change in the magnetic field generated by this magnet when the latter is rotated by a rotational driving of the gripping member.

According to one very advantageous feature of the invention, at least a most part of the portion of the support 14 defining the side wall of the cavity 24 is provided inside the through-opening 20 machined in the middle 16 once this support has been mounted on the watch case. In a preferred alternative embodiment for freeing up a maximum amount of space inside the watch case and allowing the magnetic detector 26 to be located in the vicinity of the inner wall of the middle 16, as shown in FIG. 3, the portion of the support 14 defining the cavity 24 is provided such that it is almost entirely located within the through-opening 20 in the middle, or more generally outside a geometrical volume, having a cylindrical side wall, provided inside the watch case for the horological movement 30 comprising the magnetic detector 26 or associated with an upper electronic module comprising this magnetic detector.

Figure 3:
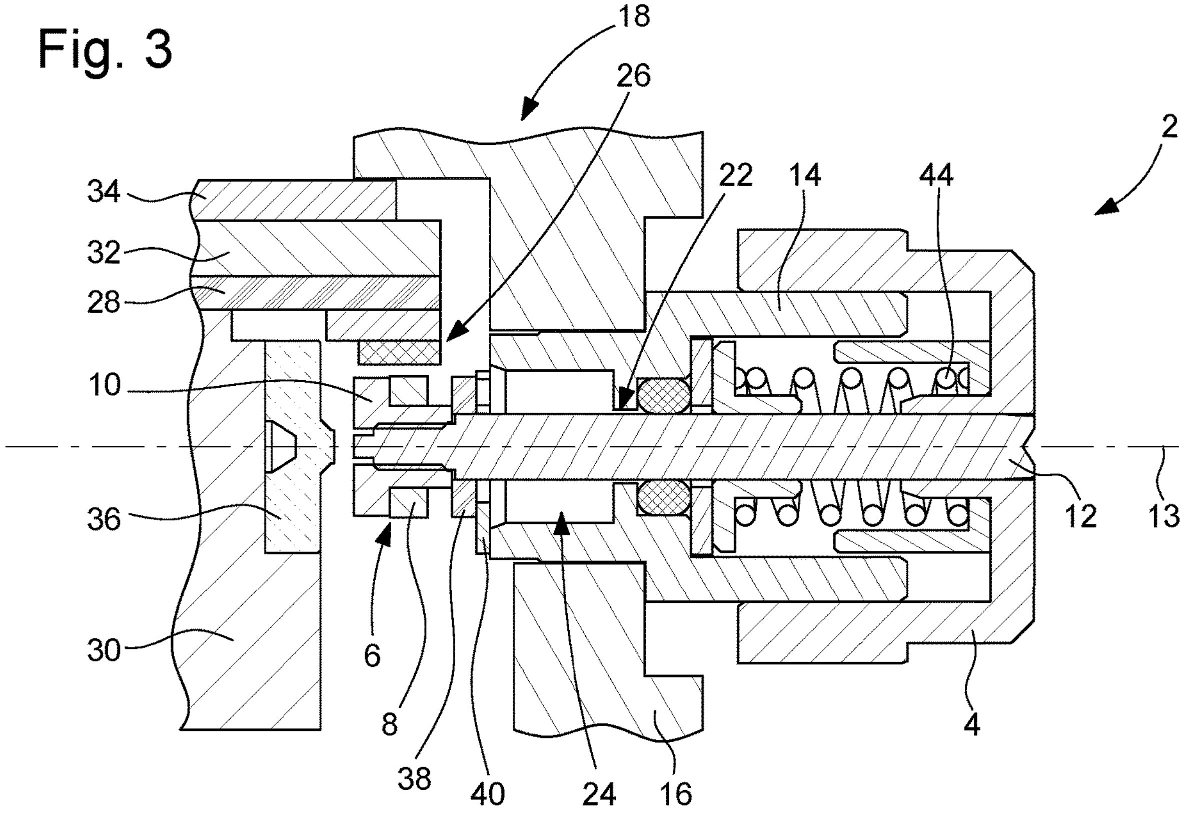
FIG. 3 shows the control device of FIG. 1 in an operational state after the movement and the detector have been mounted inside the watch case.

In FIG. 3, the magnetic detector 26 is located beneath a printed circuit board 28 which carries it and which is arranged beneath a plate 32 forming, together with the printed circuit board and the magnetic detector, an electronic module. In the alternative embodiment shown in FIG. 3, the electronic module is covered by or comprises a dial 34 for a display of the watch. In the alternative embodiment shown in this FIG. 3, the control device 2 is intended to have two functions, i.e. a first function associated with the magnetic detection of a rotation of the rotatable part, in particular of the gripping member 4, via the magnetic sensor, consisting of the magnetic detector 26 and the multipole magnet 8 of the control member 6, which are located radially facing one another, and a second push-piece function. The push-piece function is carried out by an axial movement of the rotatable part towards the horological movement which carries a force detector 36 arranged such that it can detect a force exerted thereon by the end of the shaft 12 or more generally by the inner end part of the rotatable part. A spring 44 is provided in the control device 2 for exerting a return force on the rotatable part, in particular on the gripping member 4, so as to obtain the push-piece function, and additionally to allow the control member 6, in particular the multipole magnet 8, to be returned to the best axial position for operating the magnetic rotation sensor.

According to the invention, the arrangement of the control device allows the inner end part of the rotatable part, and thus the control member, to be axially moved once this inner end part has been mounted on the shaft so as to rotate as one therewith and to be held in a fixed axial position relative to this shaft, in order to withdraw this inner end part from the operational position thereof, i.e. to place it in an axial position for mounting the magnetic detector, and more generally a movement or a module comprising this magnetic detector, inside the watch case. This axial mounting position corresponds to a pulled-out axial position of the shaft and thus of the gripping member if it is advantageously already fixedly mounted on this shaft when the magnetic detector is being mounted inside the watch case. It should be noted that the mounting of the magnetic detector inside the watch case is intended to take place before a removable or movable element is installed on the shaft in a final step, so as to axially immobilise or restrict an axial movement of the rotatable part and prevent the inner end part from moving into the axial mounting position. For this purpose, the removable or movable element, in particular a key 40, is intended to be placed between the control member 6 and a second radial surface, formed by the support 14, which is intended to provide axial support, on the through-opening 20 side in the middle 16, for this removable or movable element once in position. It should be noted that, in an alternative embodiment not shown, the second radial surface can be formed by an inner surface of the middle 16.

Thanks to the features of the control device according to the invention, the control member and more generally the inner end part of the rotatable part can be momentarily retracted, at least for the most part, into the inner cavity in the support by a momentary axial movement of the control member, and more generally of the rotatable part, into a position for mounting the detector inside the watch case. More particularly, the invention allows the control member, already fixedly mounted on the shaft, to be momentarily removed, by housing it at least in part and preferably entirely inside the through-opening machined in the middle for the passage and fixing of the control device.

In FIG. 1, the control device 2 is shown mounted inside an opening 20 in a watch case 18 and in a first state in which the spring 44 is not under load. As shown, the spring 44 is intended to exert, when the control device is in an operational state, an outward axial force on the gripping member 4 and thus on the rotatable part. In the first state, the control member 6 and more generally the inner end part of the rotatable part are partially located inside the cavity 24. It should be noted that the portion of the support defining the side wall of the cavity 24 is located almost entirely, and thus for the most part, inside the through-opening 20 provided in the middle 16 for the passage of the control device 2. The control device is intended to be in this first state prior to mounting the movement and in particular the upper electronic module comprising the magnetic detector 26 inside the watch case. This state is advantageous when delivering the watch case to a timepiece factory. More specifically, the control device can be seen to be almost completely mounted, and only the element 40 for restricting the axial movement of the rotatable part has not yet been removably mounted on the shaft 12. In particular, in this first state, the control member 6 and the gripping member are already fixedly mounted on the shaft 12, which is advantageous since the manufacturer of the watch case can thus deliver this watch case with a control device whose main elements are already assembled.

In FIG. 2, the rotatable part is placed in an axial position for mounting the movement 30, the upper electronic module (reference numerals 26, 28, 32) and the dial 34. In this axial mounting position, which corresponds to a second state of the rotatable part, the control member 6 is fully inserted into the cavity 24 and is thus located, for the most part, inside the opening 20 machined in the middle 16. In this withdrawn position, wherein the rotatable part is removed and the control member 6 is retracted into the cavity 24 and, more specifically, momentarily placed, for the most part, inside the through-opening 20, the horological movement 30 and, in particular, the upper electronic module comprising the magnetic detector 26, can be inserted from the back of the watch case, which magnetic detector is intended, in normal operation, to be in a radial position relative to the control member 6 and at a higher level, i.e. in a radial peripheral region of the control member which is located above this control member. Without the features of the control device according to the invention, such an insertion of the magnetic detector via the back of the watch case could not be carried out if the control member 6 is already mounted on the shaft 12 and placed directly in an operational position for the rotation sensor, given that in the main alternative embodiment described, the magnetic detector is intended to be inserted via the back of the watch case, as is the case for the horological movement.

In FIG. 3, the movement 30 and the upper electronic module have been placed inside the watch case and the control device 2 is thus in an operational axial position. In this third state, the control device is in a fully-assembled final configuration and the rotatable part is operational. This third state is ensured by a key 40 which is removably mounted on the shaft 12 and more generally on the rotatable part in order to restrict the axial movement of the rotatable part and above all to ensure an operational axial positioning of the control member, in particular for the rotation sensor. The key, which is an element for restricting the axial motion of the rotatable part, is intended to be removable and the mounting thereof on the shaft 12 by transverse insertion, i.e. radial insertion relative to the axis of rotation 13 takes place without difficulty from the back of the watch case after the movement 30 and the magnetic sensor 26 have been mounted.

Figure 4:
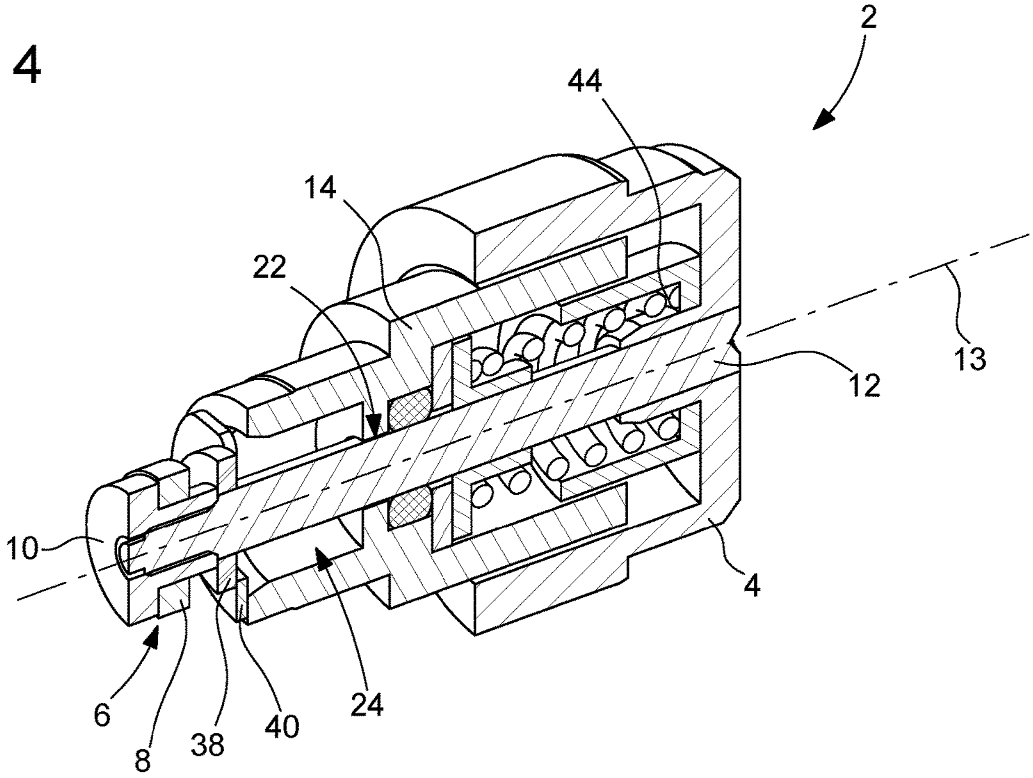
FIG. 4 is a perspective view of a longitudinal section of the control device in the operational state.

It should be noted that, in contrast to an embodiment of the prior art described hereinabove, the key 40 is arranged upstream of the control member 6, i.e. it is located between this control member and the cavity 24 or more generally the inner wall of the middle 16 and in particular the through-opening 20 in this middle. Thus, the key can come to bear axially against a fixed part of the watch case or advantageously of the support 14, whereas the control member is located downstream, i.e. on the inner side of this key, and can thus interact radially with an element placed inside the watch case. In the advantageous alternative embodiment shown in FIG. 3, the key, once installed, axially bears against a transverse/radial surface of the support 14 located at the inner end of the cavity 24. FIG. 4 shows a perspective, longitudinal sectional view of the control device 2 in said third state, similar to that of FIG. 3.

The bearing of the key, with a non-zero pressure, against the transverse/radial surface of the support 14 is achieved by the spring 44 via the washer 38 positioned between the control member 6 and the key and which bears thereagainst. The spring 44 thus has a dual function, i.e. it procures the function of a push-piece for the control device and keeps the rotatable part in an optimal, operational position for the control member, in particular the magnet 8, when no axial pressure is exerted on the gripping member 4. To summarise, the key 40 can be mounted on the rotatable part so as to be able to face a radial surface of the support into which the cavity 24 opens out and surrounding this cavity, and the control device comprises a spring 44 acting on the rotatable part so as to exert an axial force thereon, which allows the key to be kept pressed against the radial surface in the absence of an actuating force, in the opposite direction to the axial force, exerted on the rotatable part and thus ensures an optimal, operational, axial position for the control member 6. The key thus prevents the control member 6 from being re-inserted into the cavity 24 without removing this key, which is a removable element that is mounted transversely on the rotatable part between the control member and the cavity 24 of the support 14.

In connection with the restricted axial movement of the rotatable part or the axial immobilisation thereof, two alternative embodiments (not shown) are described hereinbelow. In a first alternative embodiment, the key is replaced by a movable element, in particular by a sliding element, which is arranged inside the watch case in such a way as to be able, in a first position or configuration, to axially immobilise or restrict an axial motion of the rotatable part and thus prevent at least a most part of the control member from being inserted into the cavity 24 without the movable element moving into a second position or configuration, wherein the rotatable part is released and can thus be inserted, at least for the most part, into the cavity.

In a second alternative embodiment, the control device comprises a resilient element, which is integral with the rotatable part or with the support, which is arranged such that it can be resiliently deformed upon insertion of at least a most part of the control member into the cavity or upon removal of said at least a most part of the control member from the cavity, so as to allow for, after said at least a most part of the control member is removed from the cavity after the insertion thereof into the cavity or upon the removal of said at least a most part of the control member from the cavity, an axial immobilisation or restriction of the axial motion of the rotatable part preventing said at least a most part of the control member from being able to be re-inserted into the cavity without any specific intervention to re-place the resiliently deformable element under resilient load.

The invention claimed is:

1. A control device configured to be mounted in a through-opening machined in a middle of a watch case and comprising a rotatable part and a support for the rotatable part, the rotatable part comprising a gripping member, a control member, including rotation sensor or provided to drive a mechanism located inside the watch case, and a shaft connecting the gripping member to the control member, the rotation sensor and the mechanism respectively comprising a detector and an element for coupling with the control member, the detector and the element being provided inside the watch case in a radial peripheral region of the control member, the support having a circular opening through which the shaft passes and which has a diameter that is smaller than the maximum radial dimension (D) of the control member and smaller than the maximum radial dimension of the gripping member, wherein, on a first side of the circular opening, the support has a cavity which is open in the direction of the axis of rotation and which is configured to open out into the interior of the watch case, the dimensions of the cavity being provided such that the cavity can house therein at least a most part of the control member which is fixedly mounted on the shaft, such that the control member can be momentarily at least partially retracted into the cavity following an axial movement of the shaft into a position in which the detector or the coupling element can be mounted inside the watch case.

2. The control device according to claim 1, wherein at least a most part of the portion of the support defining a side wall of the cavity is provided inside the through-opening machined in the middle.

3. The control device according to claim 2, wherein the cavity and the rotatable part are arranged such that an inner end part of the rotatable part, comprising the control member and located on the cavity side relative to the circular opening in the support, can be entirely housed within the cavity.

4. The control device according to claim 1, further comprising a removable element or a movable element which is arranged to axially immobilise or restrict the axial motion of the rotatable part, and thereby prevent said at least a most part of the control member from being able to be inserted into the cavity without removing the removable element or moving the movable element releasing the rotatable part.

5. The control device according to claim 4, wherein the removable element is a key that can be mounted on the rotatable part so as to be able to face a radial surface of the support into which the cavity opens out and surrounding this cavity, and wherein the control device further comprises a spring acting on the rotatable part so as to exert an axial force thereon, which allows the key to be kept pressed against said radial surface in the absence of an actuating force, in the opposite direction to the axial force, exerted on the rotatable part.

6. The control device according to claim 1, further comprising a resilient element, which is integral with the rotatable part or with the support, which is arranged to be resiliently deformed upon insertion of said at least a most part of the control member into the cavity or upon removal of said at least a most part of the control member from the cavity, so as to allow for, after said at least a most part of the control member is removed from the cavity after said insertion thereof into the cavity or upon said removal of said at least a most part of the control member from the cavity, an axial immobilisation or restriction of the axial motion of the rotatable part preventing said at least a most part of the control member from being able to be re-inserted into the cavity without any specific intervention to re-place the resiliently deformable element under resilient load.

7. The control device according to claim 1, wherein the control member comprises a magnet that is radially magnetised relative to the axis of rotation; and wherein the detector is a magnetic detector fixedly arranged inside the watch case so as to be able to measure a change in the magnetic field generated by the magnet when the magnet is rotated by a rotational driving of the gripping member.

8. A watch comprising the control device and the watch case of claim 1, the watch case formed by the middle in which the through-opening is machined for the passage of the control device, which is mounted on the watch case and allows a user to control at least one function of the watch.

9. A watch comprising the control device and the watch case of claim 4, the watch case formed by the middle in which the through-opening is machined for the passage of the control device, which is mounted on the watch case and allows a user to control at least one function of the watch.

10. A watch comprising the control device and the watch case of claim 6, the watch case formed by the middle in which the through-opening is machined for the passage of the control device, which is mounted on the watch case and allows a user to control at least one function of the watch.

* * * * *